3,367,849
AMPEROMETRIC DETERMINATION OF GLUCOSE

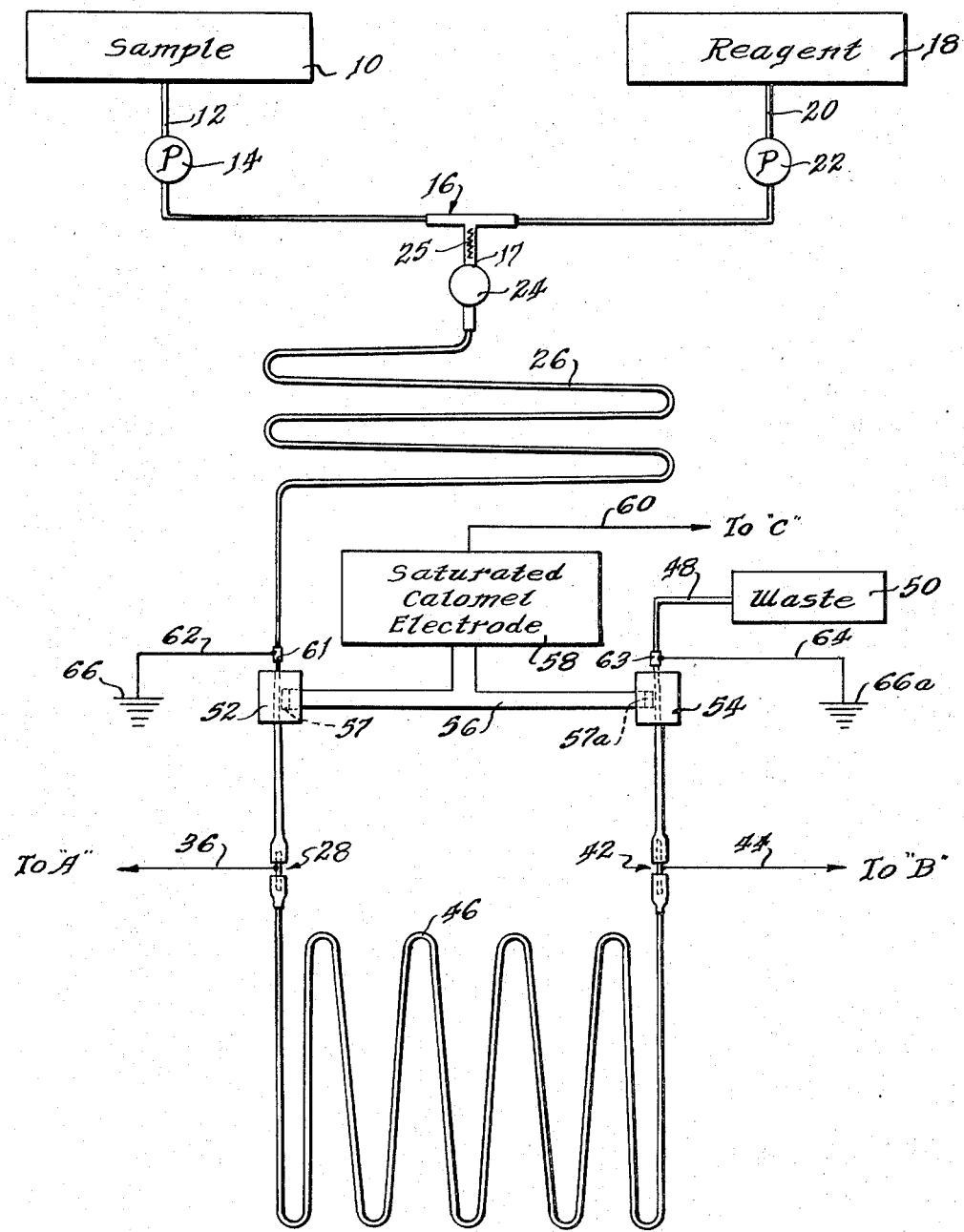

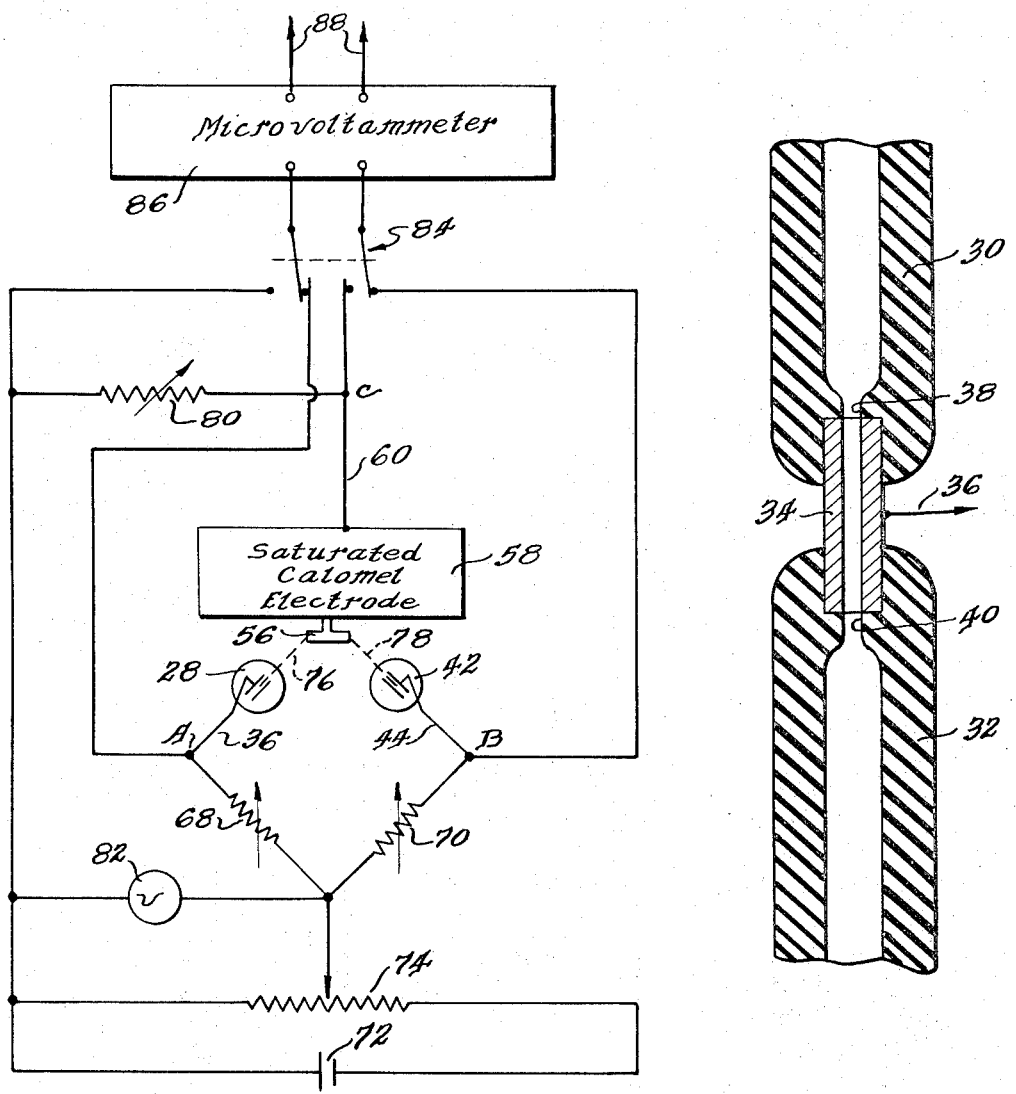

Walter J. Blaedel, Madison, Wis., and Carter L. Olson, Columbus, Ohio, assignors to the United States of America as represented by the United States Atomic Energy Commission
Filed Mar. 20, 1964, Ser. No. 353,646
7 Claims. (Cl. 204—1)

---

ABSTRACT OF THE DISCLOSURE

Apparatus and method are set forth for the rapid and accurate determination of glucose content in a flowing fluid. A buffer solution containing ferrocyanide and an enzyme which catalyzes the oxidation of glucose to produce hydrogen peroxide is added to the fluid. Hydrogen peroxide reacts with ferrocyanide to form electro-reducible ferricyanide at a rate proportional to the amount of glucose present. A pair of tubular platinum electrodes are spaced to detect the increase in concentration of ferricyanide. Readout equipment converts electrode signals directly into glucose concentration.

---

Contractual origin of the invention

The invention described herein was made in the course of, or under, a contract with the United States Atomic Energy Commission.

This invention relates to the determination of glucose concentration in a fluid by differential amperometry.

There are many devices and methods used in the determination of glucose content in fluids. Few of these are adaptable for automation. Some of the most frequently used methods for quantity or routine determinations such as are called for in hospital laboratories use fairly expensive spectrophotometric equipment. Some automated equipment requires around a ten minute delay in readout time for the first sample.

With rising labor costs it is increasingly important that time-saving methods be devised and more completely automated equipment be designed. As the frontiers of medicine roll back it is increasingly important that such equipment and methods have greater accuracy and higher sensitivity for use in such fields as pre-diabetic diagnosis.

Existing methods and equipment often require time-consuming preparatory steps to remove interfering compounds. This is particularly true of blood plasma or serum samples where glucose analysis is based on color-forming reactions. Protein removal is frequently necessary before glucose analysis can be started.

The present invention includes most of the above advantages and overcomes most of the disadvantages. The present invention utilizes the initial stages of an enzyme catalyzed oxidation of glucose to produce an electroactive species which is detected in a highly sensitive amperometric direct readout apparatus.

It is accordingly, an object of this invention to provide an inexpensive apparatus which gives a highly sensitive and accurate determination of glucose concentration in a fluid.

It is also an object of this invention to provide for an automated, direct readout determination of glucose wherein an output signal is dependent on the formation or disappearance of an electroactive species.

It is a further object of this invention to provide for an automated determination of glucose in blood serum or plasma in which a preliminary deproteinization step is not necessary.

It is an additional object of this invention to provide a rapid means for analysis of glucose utilizing only the initial stages of a well known reaction.

Other objects and advantages of the present invention will be apparent from the following description and drawings in which:

FIG. 1 is a diagrammatic layout showing the flow path of fluids in the apparatus of this invention;

FIG. 2 is a diagram showing the electrical layout for the apparatus of the present invention; and FIG. 3 is a sectional view of a tubular platinum electrode.

In FIG. 1, a sample container 10 feeds a fluid containing glucose into a flexible delivery tube 12 and through a peristaltic pump 14 which meters the flow of sample fluid into a mixing T 16. Reagents to be mixed with the sample fluid are fed from a reagent solution container 18 into a flexible delivery tube 20 passing through a peristaltic pump 22 which meters the flow of reagent solution to the mixing T 16. We prefer flow rates of about 1 to 2 ml. per minute with delivery tubes 12 and 20 and the mixing T 16 having about 2 mm. inside diameters. The peristaltic pumps 14 and 22 may be any one of several standard types available in which a flow of fluids is induced within a flexible tube by repeated peristaltic pulses applied externally to the tube.

We have found it advantageous to insert a pulser 24 into a vertical portion 17 of the mixing T 16. The pulser 24 is preferably of a type which intermittently pinches a flexible tube through which fluid flows. The function of the pulser 24 is to momentarily reverse the flow of fluids in the T 16 to promote better mixing of sample and reagent solution by disrupting laminar flow. We prefer to use a pulse frequency of about 300 per minute with an amplitude which will cause a reverse flow for 1 to 2 cm. in a tube having a 2 mm. inside diameter. We have also found it advantageous to insert, as schematically indicated at 25, about a four inch length of 26 gauge platinum wire, randomly kinked, into the vertical portion 17 of the mixing T 16 to further promote thorough mixing of sample and reagent solution.

The reaction which begins shortly after mixing the sample and reagent solution is the well-known glucose oxidase catalyzed oxidation of glucose to gluconic acid and hydrogen peroxide in the presence of dissolved air:

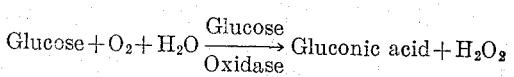

$$\text{Glucose} + O_2 + H_2O \xrightarrow[\text{Oxidase}]{\text{Glucose}} \text{Gluconic acid} + H_2O_2$$

In the present invention we have discovered a method of determining glucose concentration in a sample without waiting for the above reaction to proceed to completion. This avoids both a loss of time and the inaccuracies inherent in an indefinite endpoint.

We have found that the rate of the above reaction may be measured amperometrically if it is accompanied by a dependent reaction which involves a quick-response change in concentration of an electroactive species. An electroctive species, for the purpose of this invention is a substance that is electrooxidizable or electroreducible when subjected to a proper applied potential, and that will carry a current in a solution when subjected to a proper applied potential, the amount of current carried being dependent on the concentration of the electroactive species in the solution. The preferred dependent reaction utilizes hydrogen peroxide to oxidize a reagent to form an electroreducible substance.

In the initial stages of glucose oxidation, the above reaction proceeds at a linear rate dependent on the concentration of glucose. Therefore, the rate of production of $H_2O_2$ is also linearly dependent on the concentration of glucose. The present invention takes advantage of this fact to obtain a rapid analysis. In order to allow sufficient time for the oxidation of glucose to be initiated so as to proceed at a linear rate, the apparatus of the present invention, as shown in FIG. 1, is provided with an 18″ long induction delay line 26 of 1/16″ I.D. flexible tubing. The latter leads to a first tubular platinum electrode (TPE) 28 which is shown in greater detail in FIG. 3.

The tubular platinum electrode (TPE) as shown in FIG. 3 has an inlet tube 30 and an outlet tube 32 sealed to either end of a platinum tube 34. While we have used for this purpose half inch lengths of seamless platinum tubing having an 0.040″ I.D., it is not intended that this invention be limited to these dimensions. A wire 36 is attached to the platium tube 34 to provide an electrical connection. The inlet tube 30 and outlet tube 32 are of soft glass tubing having about a 3 mm. I.D. An inlet orifice 38 and an outlet orifice 40 are preferably no smaller than the inside diameter of the platinum tube 34 and should be smooth to promote laminar flow through the platinum tube 34.

In FIG. 1, a second tubular platinum electrode (TPE) 42 with attached electrical contact wire 44 is similar to the first TPE 28. However, the wire 36 connects the first TPE 28 to point A in FIG. 2, while the wire 44 connects the second TPE 42 to point B in FIG. 2. Between the first and second electrodes is a 40″ long interelectrode delay line 46 of 1/16″ I.D. flexible tubing. The interelectrode delay line 46 is chosen long enough to produce sufficient electro-active material for accurate measurement. A discharge line 48 carries the mixture to a waste container 50.

Upstream from the first TPE 28 and downstream from the second TPE 42 are salt bridge contact blocks 52 and 54, respectively, in which the flowing mixture is brought into electrical contact with a saturated KCl salt bridge 56. This may be done in any of a number of ways. We have used a porous material such as a fine glass frit, schematically indicated at 57 and 57a, tangent to the flowing stream to complete solution contact with the saturated fluid in the salt bridge.

The salt bridge 56 is connected to a standard saturated calomel reference electrode (SCE) 58. This single reference electrode 58 is bridged to both TPE's to avoid any asymmetry potential which might arise if a separate reference electrode were bridged to each TPE. An electrical contact wire 60 connects the SCE 58 to point C in FIG. 2.

In order to electrically isolate the flowing stream in the TPE-SCE system from the rest of the apparatus, immediately upstream from contact block 52 and downstream from contact block 54 ground wires 62 and 64, respectively, ground the flowing stream to a common ground 66 and 66a. This may be done in any of a number of ways such as inserting short lengths of platinum tubing 61 and 63 at each point to be grounded.

The electrical circuit for the present invention as shown in FIG. 2 is basically a bridge comprising a first half having a first variable resistor 68 in series with the first TPE 28 and a second half having a second variable resistor 70 in series with the second TPE 42. A proper potential is applied to the bridge by a 1.5 volt battery 72 through a third variable resistor 74. In the presence of an electroactive species a current passes through the flowing streams represented by dashed lines 76 and 78 between the respective TPE's and the salt bridge 56.

Two useful auxiliary devices are a fourth variable resistor 80, the voltage across which provides a measure of the total current passing through the two TPE's, and a 0–3 v. D.C. voltmeter 82, which gives an estimate of the voltage applied to the TPE's.

A double-pole, double-throw switch 84 connects the bridge system to a microvoltammeter 86. In the position shown in FIG. 2 the switch 84 permits measurement of any potential change between halves of the bridge at points A and B.

Once the bridge has been balanced by adjusting the first and second resistors 68 and 70, without glucose in the flowing stream, any change in potential between points A and B is proportional to the difference in currents through the TPE's 28 and 42 which in turn is dependent on the amount of electroactive species produced or used up in the delay line 46.

The rate of forming or using up an electroactive species is linearly dependent on the concentration of glucose present in the sample during the initial stages of the reaction. This apparatus and method are intended to take advantage of this fact. The concentration of glucose may be obtained by any suitable dial or recording direct read-out device made responsive to an output signal 88 which is based on the potential difference between points A and B.

Sensitivity may be changed without upsetting the bridge balance by changing the sensitivity of the microvoltammeter. The sensitivity may be set for full-scale at such concentrations as 100 p.p.m., 10 p.p.m. or 1 p.p.m. of glucose depending on the glucose concentration in the sample. A full-scale sensitivity on the microvoltammeter of 3 mv. was adequate for a sample containing 100 p.p.m. of glucose, when the TPE's were 80 mv. cathodic with respect to the SCE and the first and second variable resistors 68 and 70 were set at about 200 ohms each.

For best sensitivity we prefer to bleed off stray electrical disturbances by surrounding the electrical components with grounded wire screening. This is not shown in the drawings because such methods of grounding are considered to be within the ability of one skilled in the art.

In order to take advantage of the highly sensitive and extremely accurate capabilities of this apparatus and method it is advisable to work with samples having a glucose content of about 100 p.p.m. or less. When samples are known to contain more than this amount of glucose, the sample may be diluted with an aqueous buffer solution containing no electroactive substances. A suitable aqueous buffer solution for preparation of both sample and reagent solutions is made 0.10 M in KCl and 0.10 M in $Na_2HPO_4$, and is adjusted to pH 7.5 by adding $NaH_2PO_4$.

A standard glucose stock solution containing 100 p.p.m. of glucose was prepared by dissolving 25 mg. of glucose in 250 ml. of buffer solution. Solutions containing lower concentrations of glucose were prepared by volumetric dilution of the stock solution with the buffer solution.

The reagent solution was prepared by dissolving one gram of glucose oxidase and 10 mg. of peroxidase in 500 ml. of buffer solution and then filtering. In order to prevent premature oxidation, the filtered solution was deaerated with a stream of nitrogen prior to the addition of a reagent capable of forming an electroreducible substance. One such reagent is potassium ferrocyanide, $K_4Fe(CN)_6 \cdot 3H_2O$, of which 2.11 grams (reagent grade) were added to the above deaerated solution to make the reagent solution 0.010 M in $K_4Fe(CN)_6$. Potassium ferrocyanide is oxidized by $H_2O_2$ to potassium ferricyanide, $K_3Fe(CN)_6$, which is reducible at the TPE. Reagents other than ferrocyanide salts may be used if they react with $H_2O_2$ to produce a change in concentration of an electroactive species.

One of the advantages of the present invention lies in the fact that no preliminary deproteinization of blood plasma or serum is necessary. This is due largely to the extreme sensitivity of the tubular platinum electrode which enables it to function at very low current levels. Such sensitivity also makes it possible to work with considerable precision on dilute samples having glucose concentrations even lower than 1 p.p.m. This sensitivity is many times greater than that which is possible with any of the existing methods. Blood serum samples which normally contain about 1000 p.p.m. of glucose are routinely diluted 100 times to a 10 p.p.m. range for analysis in the present invention.

The standard deviation of individual points from a straight line in the 0–100 p.p.m. range was less than 1 p.p.m. of glucose. In the 0–1 p.p.m. range the standard deviation was less than 0.01 p.p.m. of glucose. Such sensitivity and precision are rarely attained even in single sample analysis, much less in automated equipment.

The optimum potential applied to the TPE's was found to be between about 60 and 120 mv. (TPE's cathodic with respect to the SCE). Using the above reagent solution, and a buffer solution in place of a glucose-containing sample, the residual current was less than 0.1 microampere when the TPE's were cathodic by 60 to 120 mv. with respect to the SCE. This was true over a pH range of 7.0 to 7.75. At more anodic potentials, the current increased rapidly due to ferrocyanide oxidation, while at more cathodic potentials oxygen was reduced. At about 80 mv. applied potential, the residual current through the TPE's was approximately zero. These observations define the proper applied potential for optimum operation. While it is preferable to operate within these limits, we do not intend this to exclude operation beyond these limits.

Even though the only oxygen present was that which was dissolved in the sample solution, we have found that due to the high sensitivity with dilute samples this was sufficient for the purposes of the present invention. Sample solutions containing 100 p.p.m. glucose gave the same response whether air-saturated or oxygen-saturated.

We have found that the apparatus of the present invention is relatively insensitive to minor temperature variations. It is not necessary that temperature conditions be controlled with a high degree of accuracy, providing that standardizations are performed occasionally. In order to reduce the effect of sudden temperature fluctuations and drafts, the delay line may be embedded in a block of some suitable insulating medium such as ceresin wax.

Sample change merely involves substituting one sample container for another and allowing a short time for steady state conditions to be established in the flowing stream. Each sample is analyzed with only a three minute readout time. Twenty samples may be analyzed per hour. Complete automation would require only the addition of a turntable to deliver successive samples to the delivery tube 12 in FIG. 1.

It is not intended that this invention be limited to reactions which produce electroactive species, but also may include reactions in which an electroactive reagent initially present is used up or changed to another species. Fragmentary work has indicated that o-toluidine and o-dianisidine are suitable as such reagents. The differential amperometric method would differ here only in that a potential difference between points A and B in FIG. 2 would be due to a decrease in current in the second TPE 42, rather than an increase.

It is understood that this invention is not to be limited to the above description but may be modified within the scope of the attached claims.

The embodiments of the invention in which an exclusive property or privilege is claimed are defined as follows:

1. An apparatus for amperometrically determining glucose content in a flowing stream, comprising: a first pump means for metering the flow of a glucose-containing fluid; a second pump means for metering the flow of a reagent solution, containing glucose oxidase, peroxidase, and a compound capable of reacting with hydrogen peroxide to produce an electroactive species; pulsing means for mixing said fluid and reagent solution; induction delay means for receiving the mixture from said pulsing means; a first tubular platinum electrode positioned to receive said mixture as a flowing stream from the induction delay means; an interelectrode delay line connected to said first electrode, said electroactive species being formed in said interelectrode delay line at a rate linearly dependent on the concentration of glucose in said fluid; a second tubular platinum electrode positioned to receive said flowing stream from said interelectrode delay line; a bridge circuit comprising: a saturated calomel electrode, a salt bridge connecting said calomel electrode to the flowing stream adjacent to both first and second electrodes, a first variable resistor in series with said first electrode, a second variable resistor in series with said second electrode, said resistors being connected to complete said bridge; means for applying a potential to said bridge; and means for providing a signal proportional to a change in potential between halves of the bridge, said change being dependent on a differential increase in current through said tubular platinum electrodes, which differential is dependent on the difference in amount of electroactive species formed in said flowing stream between said first and said second electrodes.

2. A method of amperometrically determining the glucose content of a fluid, comprising: adding to said fluid a buffer solution which contains an enzyme for catalyzing the oxidation of glucose to produce hydrogen peroxide, and which solution contains a ferrocyanide compound together with an enzyme for catalyzing the hydrogen peroxide oxidation of the ferrocyanide compound to a ferricyanide compound, said ferricyanide compound being an electroreducible substance; mixing said fluid and buffer solution; measuring the electrical current at a proper applied direct current potential between a first pair of electrodes including a platinum cathode in said mixture; measuring the electrical current at a proper applied direct current potential between a second pair of electrodes identical to said first pair in said mixture after it passes the first pair of electrodes and a delay line, said currents being dependent on the amount of electroactive ferricyanide present; and providing a signal dependent on the difference in said currents, said difference being linearly dependent on the concentration of glucose in said fluid.

3. A method of determining glucose content in a glucose-containing fluid, comprising: mixing said fluid with a buffer solution containing an enzyme which catalyzes the oxidation of glucose to produce hydrogen peroxide, and containing a ferrocyanide compound which reacts with the hydrogen peroxide to form a ferricyanide compound; passing the mixture as a flowing stream through a first electrode unit comprising a pair of electrodes including a platinum cathode, a delay line, and a second electrode unit including a platinum cathode; applying a low direct current potential to said electrode units so that ferricyanide is reduced at the platinum cathode of each electrode unit to provide a current dependent on the amount of said ferricyanide present; and producing a signal dependent on the difference in currents through said first and second electrode units, said difference being dependent on the rate of formation of said ferricyanide in said flowing stream in the delay line between said electrode units, said rate of formation being dependent on the amount of glucose present in said fluid.

4. A method of determining glucose content in a glucose-containing fluid, comprising: mixing said fluid with a buffer solution containing glucose oxidase, potassium ferrocyanide and peroxidase, said glucose oxidase catalyzing the oxidation of glucose to produce hydrogen peroxide; passing the mixture as a flowing stream through an induction delay line, a first electrode unit comprising a platinum cathode and a saturated calomel reference electrode, an interelectrode delay line, and a second electrode unit comprising a platinum cathode and said reference electrode, said glucose being oxidized at a linear rate in said interelectrode delay line and said potassium ferrocyanide being oxidized to potassium ferricyanide rapidly by the hydrogen peroxide in the presence of peroxidase; applying a low direct current potential to said electrode units of a magnitude such that potassium ferricyanide is reduced to provide current between each cathode and the reference electrode; and providing a signal dependent on the difference in the currents through said first and second electrode units, said difference being dependent on the rate of formation of potassium ferricyanide in said delay line, said rate being linearly dependent on the concentration of glucose present in said fluid.

5. The method according to claim 4 in which the applied potential is sufficiently cathodic to avoid oxidation of the ferrocyanide and yet is sufficiently anodic to avoid reduction of oxygen in said fluid.

6. The method according to claim 5 in which the applied potential is between about 60 mv. and 120 mv.

7. The method according to claim 6 in which the applied potential is about 80 mv.

References Cited

UNITED STATES PATENTS 3,208,926   9/1965   Eckfeldt _____ 204—195

OTHER REFERENCES

Malmstadt et al.: "Analytical Chemistry," vol. 33, 1961, pp. 1040–1047.

Bladel et al.: "Analytical Chemistry," vol. 34, 1962, pp. 388–394.

Pardue: "Analytical Chemistry," vol. 35, 1963, pp. 1240–1243.

HOWARD S. WILLIAMS, *Primary Examiner.*

JOHN H. MACK, *Examiner.*

T. TUNG, *Assistant Examiner.*